United States Patent [19]

Billet et al.

[11] 4,416,564

[45] Nov. 22, 1983

[54] HUB AND WEB ASSEMBLY

[75] Inventors: René Billet, Lamorlaye; Pierre Renaud, Le Plessis-Trévise, both of France

[73] Assignee: Valeo, Paris, France

[21] Appl. No.: 315,975

[22] Filed: Oct. 28, 1981

[30] Foreign Application Priority Data

Oct. 31, 1980 [FR] France ............................. 80 23307

[51] Int. Cl.$^3$ ..................... B25G 3/00; F16B 7/18; F16D 1/00
[52] U.S. Cl. ............................. 403/282; 192/106.2; 403/359; 403/345
[58] Field of Search ............... 403/345, 282, 359, 263, 403/165; 192/106.2, 106.1; 29/432, 525, 475; 411/180

[56] References Cited

U.S. PATENT DOCUMENTS 3,938,635  2/1976  Davies et al. ................... 192/106.2
4,188,800  2/1980  Fujita et al. ...................... 403/282
4,330,914  5/1982  Hood ................................ 403/282

Primary Examiner—Wayne L. Shedd
Attorney, Agent, or Firm—Charles E. Brown

[57] ABSTRACT

A hub and web assembly such as for a clutch plate or pulley half in which the outer component comprises a sleeve with a web and the inner component a hub. The inturned terminal end of the sleeve bears axially against a transverse shoulder to positively determine the relative axial position of the components. Also, a bead formed from the inner component is swaged against the opposite side of the inturned terminal end. The length of the serrations on the sleeve is shorter than the total length thereof. A cylindrical bearing surface on the end of the sleeve adjacent the actual web bears tightly against a corresponding cylindrical bearing surface on the hub remote from the transverse shoulder. This arrangement permits limited torsion of the web without loosening the mating serrations on the components.

21 Claims, 8 Drawing Figures

HUB AND WEB ASSEMBLY

FIELD OF THE INVENTION

The present invention relates generally to assembly comprising an axially extending hub and a radially extending web or disk on the periphery of the hub.

Such an assembly may be used in the manufacture of a driven disk or clutch plate of an automotive friction clutch, in which case the web extends transversely relative to the hub. It may also be an assembly for forming a pulley, in particular a PIV pulley, the web of such an assembly forming a pulley side which is at least in part frustoconical and extends at an angle from the associated hub.

DESCRIPTION OF THE PRIOR ART

Such assemblies with axial hubs and peripheral webs may be formed in a single part. But the manufacture of such a part is relatively expensive owing to the manufacturing process, namely forging, which is not susceptible of high production rates and mass production.

Accordingly, it has been proposed to make hub and web assemblies by assembling two coaxial components. Such is the case with French patent No. 1,096,443 and French printed patent application No. 2,256,686.

In each of these patents, for the assembly of two coaxial components, the inner one most often forms a cylindrical hub and the outer one is joined to the inner component by axial engagement. One of the components comprises longitudinal die serrations adapted to form in the other component complementary serrations during assembly by driving the outer component axially onto the inner component.

The outer components of the assemblies of these French patent references in practice comprise a mere web or disk of blanked out sheet metal and is therefore of reduced axially extent, limited by the thickness of the web or disk.

Also, the die serrations are in practice usually provided on the inner periphery of the outer component and during axial engagement of the outer component on the inner component, the die serrations cut into the surface of the inner component complementary serrations which must mate with the die serrations. The metal of the inner component is driven axially during this operation as chips in the case of French patent No. 1,096,443 which are then accommodated in a groove provided in the periphery of inner component for this purpose. Or, the metal is driven back in the form of bosses which gradually build up into an axial abutment on the outer component to positively determine the ultimate position of the outer component on the inner component.

To enable the cutting of such serrations the outer component must be of considerable hardness, greater than that of the inner component: in practice this means case hardening or carbonitriding heat treatment of the outer component and annealing, or quenching and tempering of the inner component.

Although these operations have given satisfaction in numerous applications, they are unsuitable for others, namely those in which the ultimate hub and web assembly is subjected to vibrations or periodic forces, namely, rotating flexure or torsion. This is precisely the case with rigid driven disks or clutch plates in which no torsion damping means are interposed between the assembly of axial hub and the peripheral disk and the corresponding friction facings. In this case the peripheral disk may be subjected to periodic forces of rotating flexure or torsion produced by a defect in the web and/or misalignment between the axis of the driven disc or clutch plate and the rest of the associated clutch.

Moreover, in German patent No. 193,444 it was proposed to provide the outer component with a sleeve for axial engagement with the inner component. Thus, the outer component comprises a sleeve in contact with the inner component so that the length of engagement on the inner component is axially extended and in any event substantially longer than the mere width of the disk or web. The rigidity of the assembly is considerably enhanced.

Still, in this German patent the axially position of the outer component relative to the inner component is indeterminate. Furthermore, the die serrations on the inner component extend along the entire length thereof whereby the complementary serrations formed on the outer component extend along the entire length of the sleeve, and serrations on the outer component in engagement with the serrations on the inner component are not only subjected to the torque transmitted by one of the components to the other, but also, any possible rotating flexure or torsion forces are liable to cause play to develop between the serrations, detrimental to the service life of the assembly.

OBJECT AND SUMMARY OF THE INVENTION

The main object of the present invention is the provision of an assembly which overcomes these various drawbacks.

According to the invention there is provided an assembly of two coaxial components comprising an inner component defining a cylindrical hub and an outer component including a sleeve driven axially onto the inner component. The longitudinal die serrations on one of the components form generally complementary serrations on the other component when the components are driven axially onto each other. The novel assembly is characterized by the outer component comprising an inturned terminal end and the inner component comprising a transverse shoulder; the inturned terminal end bears against the transverse shoulder for positively determining the axial portion of the outer component on the inner component.

Preferably, according to a second important feature of the invention, the length (e) of the die serrations formed on the outer component or the inner component is axially shorter than the effective length (E) of the sleeve overlying the inner component; a smooth bearing surface on the outer component remote from the transverse shoulder tightly receives a corresponding smooth bearing surface on the inner component remote from the transverse shoulder. Thus the sleeve and the inner component are in contact along smooth cylindrical bearing surfaces to the side of the serrations axially remote from the transverse shoulder to permit slight torsional movement of the outer component remote from the inturned terminal end.

Owing to this additional feature of the invention there is advantageously a disassociation between a first part of the components which must withstand the periodic forces of rotating flexure of torsion which is the part interconnecting the components through the smooth bearing surfaces only, and a second part of the components which transmits torque which is the part rotationally joined by the serrations. The serrations are therefore spared accordingly.

These two arrangements are advantageously employed together; the advantages of the additional feature are all the more effective when the inturned terminal end of the sleeve accurately positions the outer component on the inner component.

Features and advantages of the invention will become apparent from the description which follows, given by way of example, with reference to the accompanying drawings.

DETAILED DESCRIPTION OF THE PREFERRED EMBODIMENT

Figure 1:
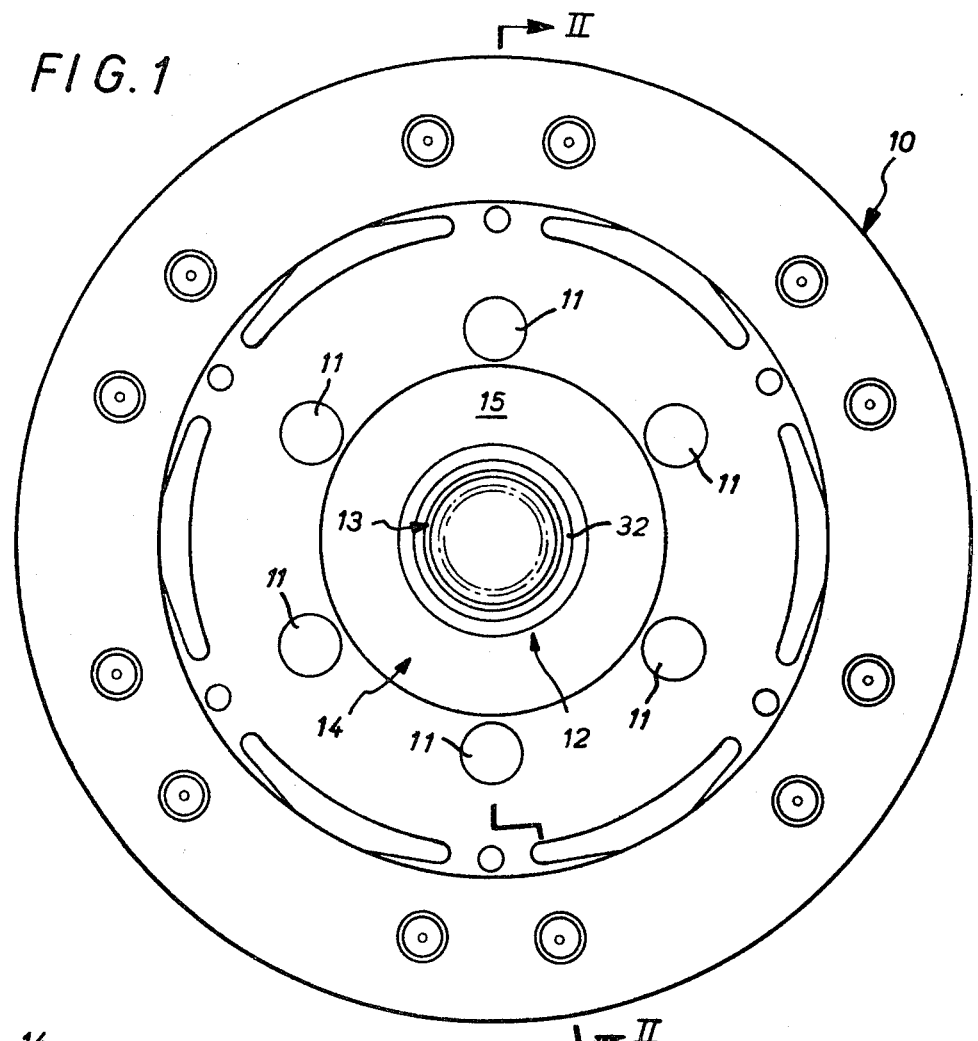
FIG. 1 is an elevational view of a hub and web assembly embodying the invention.

The drawings illustrate, by way of example, the use of the hub and web assembly according to the invention in a clutch plate or driven disk. As shown the clutch plate or driven disk is rigid, that is, the disk 10 carrying the friction facings is rigidly secured by rivets 11 to the hub and web assembly per se.

The hub and web assembly comprises an assembly of two coaxial components received inside each other, namely, an inner component 13 which forms a cylindrical hub, and an outer component 14 which is received on and joined to the inner component 13 and forms a transverse annular web 15 carrying the friction facings disk 10.

The hub has internal splines 16 for cooperation with corrresponding splines on a shaft for fixing the hub for rotation with the shaft.

The outer periphery of the hub comprises, in succession, a first cylindrical bearing surface 17 having a diameter D1, then a transverse shoulder 18, a second cylindrical bearing surface 19 having a diameter D2 greater than diameter D1, then a transverse shoulder 20 followed by a bevel or chamfer 21, a third cylindrical bearing surface 22 having a diameter D3 greater than diameter D2, then a fourth (interrupted) cylindrical bearing surface 23 having a diameter D4 about that of diameter D3, and last of all, a fifth cylindrical bearing surface 24 having a diameter D5 greater than diameter D4.

Cylindrical bearing surface 23 has outwardly projecting teeth or serrations 29 referred to hereinbelow as die serrations. Preferably, the serrations 29 are longitudinal and define a straight knurl, in other words, the tips 29 are parallel to the axis of the hub and web assembly. Preferably, the serrations 29 are formed by knurling or rolling, that is, by plastic deformation radially inwardly and outwardly of an initial reference diameter which is substantially equal to the diameter D5 of the cylindrical bearing surface 24.

Figure 6:
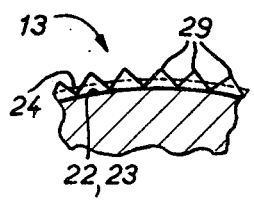
FIG. 6 is a fragmentary sectional view taken along the line VI—VI in FIG. 5.

As illustrated in FIG. 6, the serrations define substantially right-angle dihedral angles. Such a profile is an advantageous compromise between a large number of serrations and facilitating the knurling or rolling of serrations.

Cylindrical bearing surfaces 17, 22 and 24 on the hub are all smooth and continuous surfaces.

Figure 2:
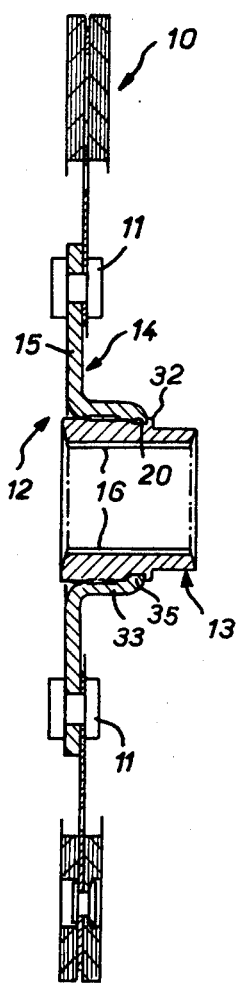
FIG. 2 is a longitudinal sectional view taken along broken line II—II in FIG. 1.
Figure 3:
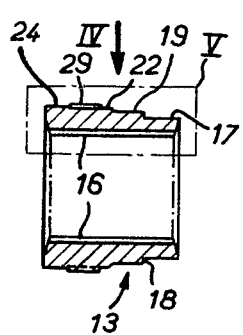
FIG. 3 is a longitudinal view of the inner component.

Initially, i.e., prior to assembly, the cylindrical bearing surface 19 of the hub is smooth along its entire length, see FIGS. 3, 4, 5 and 8. After the outer component 14 is joined to the hub, as will be described in detail hereinbelow, there is formed at its end opposite from the transverse shoulder 20, a radially outwardly extending swaged bead 32, see FIG. 2.

The outer component 14 of the assembly 12 has a sleeve 33 for engagement with the hub 13. The sleeve 33 is formed in one piece with the actual web 15 of the outer component, and a large-radius fillet 34 connects the sleeve 33 to the web 15. As illustrated, the web 15 extends transversely from the front end of the sleeve 33 relative to the direction the outer component 14 is engaged on the inner component 13 as will be explained below.

The terminal end 35 of the sleeve 33 which is also the rear end relative to the direction of engagement on the inner component 19, is, according to the invention, inturned, or turned radially inwardly toward the axis of the assembly. The inturned terminal end 35 is connected to the end of the sleeve 33 by a large-radius fillet 36.

The sleeve 33 has an internal diameter D6 substantially equal to the diameter D5 of the cylindrical bearing surface 24 of the hub 13, and the diameter D7 of the inturned terminal end 35 is substantially equal to diameter D2 of the cylindrical bearing surface 19 on the hub 13. As will be readily understood, the outer component 14 may be easily stamped into an initially flat blank.

In practice, the material of the blank is selected to be softer than the material of the hub 13, and there is no need for any heat treatment of the blank after stamping.

Figures 7, 8:
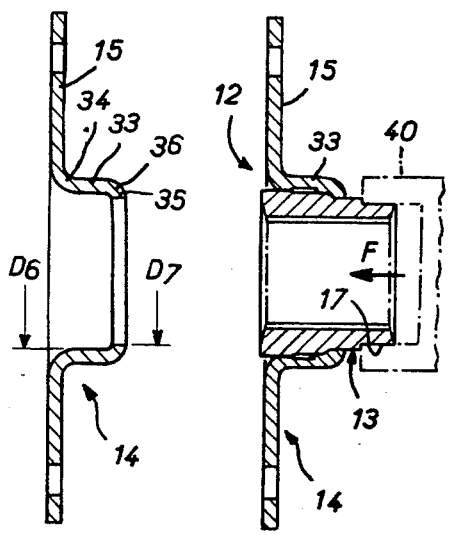
FIG. 7 is a longitudinal sectional view of the outer component.
FIG. 8 is a longitudinal sectional view of the hub and web assembly.
Figure 4:
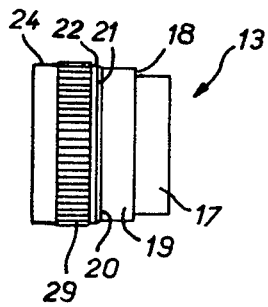
FIG. 4 is a top plan view taken in the direction of arrow IV in FIG. 3.

The inner and outer components 13 and 14 are assembled by driving the outer component 14 axially onto the inner component in a press, starting from the smallest diameter cylindrical bearing surface 18 in the direction of arrow F in FIG. 8. As the outer component 14 is driven axially onto the inner component 13, the die serrations 29 on the inner component 13, by extruding and driving the material and therefore providing good interengagement, to form substantially complementary serrations mating with the die serrations. The cooperating serrations intimately rotationally fix the inner and outer components 13 and 14 together.

Thus, in practice, the internal serrations on the sleeve 33 are formed without any substantial removal of stock or formation of chips.

Figure 5:
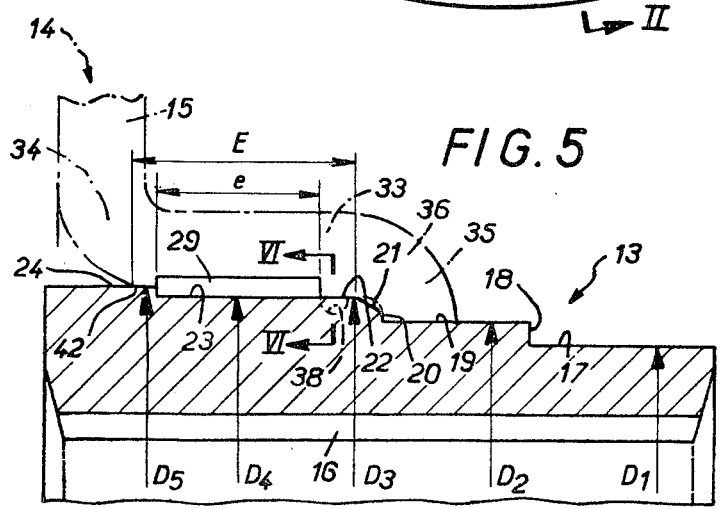
FIG. 5 is a detail view, on an enlarged scale, of the portion of the inner component enclosed in the chain-dotted rectangle V in FIG. 3.

If necessary, however, a groove 38 may be provided at the rear of the serrations 29 at the cylindrical bearing surface 22 on inner component 13 for collecting such chips, as shown in phantom lines in FIG. 5.

In practice, the outer component 14 is driven axially to the opposite end of the inner component. At the conclusion of this operation, the inturned terminal end 35 of the outer component 14 is in abutment against the transverse shoulder 20 on the inner component 13, as is shown in solid lines in FIG. 8 and chain-dotted lines in FIG. 5, thereby perfectly, positively defining the position of the outer component 14 on the inner component 13.

As the outer component 14 is driven onto the inner component, the swaged bead 32 is formed from the material of the inner component 13 by the driving material of the inner component into contact with the inturned terminal end 33, for example, by means of an annular swaging tool 40, in the direction of arrow F in FIG. 8, onto the cylindrical bearing surface 17 on inner component 13 as shown by chain-dotted lines in FIG. 8. The swaged bead 32 may, of course, be either circularly continuous or divided into separate angularly-spaced bosses.

In any event, the retaining means formed from the inner component by swaging are in abutment against the inturned terminal end 35 of the outer component 14 behind the inturned terminal end 35, in other words at the side of the inturned terminal end 35 remote from the transverse shoulder 20 of the inner component 13 against which the inturned terminal end 35 is in abutment. The axial position of the outer component 14 relative to the inner component 13 is thus strengthened and fixed in either axial direction.

Components 13 and 14 are in meshing engagement along the entire length of the die serrations 29 of the inner component 13 which may be considerably greater than the thickness of the blank from which the outer component 14 is stamped and therefore the thickness of the web 15 thereof.

As will also be noted, the axial length e of engagement of the serrations of the outer component 14 with the die serrations 29 of the inner component 13, is shorter than the effective axial length E of engagement of the sleeve 33 of the outer component 14 on the inner component 13. The serrations on the outer component 14 are axially offset relative to the web 15 thereon. In front of the teeth on the outer component 14 in the vicinity of the web 15, the sleeve 33 has a serrated cylindrical internal bearing surface 42 tightly received around the smooth cylindrical bearing surface 24 on the inner component 13. Bearing surfaces 24 and 42 are both substantially in alignment with the web 15, and more particularly as shown, in radial alignment therewith.

According to a preferred feature of the invention, these bearing surfaces permit, whenever the circumstances may arise, the web 15 to withstand the periodic forces of rotational flexure without being detrimental to adjacent serrations, by absorbing the forces of rotational flexure before they reach the serrations.

The present invention is, moreover, not intended to be limited to the illustrated and described embodiment, but may admit of various modifications and alternatives without departing from the spirit and scope of the invention.

Further, the field of the invention is not limited to clutch plate or driven disks for clutches, but encompasses in general all web and hub type assemblies where the components are driven axially onto each other, for example, in the case of pulley halves of speed change devices.

What is claimed is:

1. An assembly of two coaxial components comprising an inner component defining a cylindrical hub and an outer component including a sleeve having an axial drive fit onto said inner component, one of said components having longitudinal broaching serrations, substantially complementary serrations on the other of said components having the appearance of being formed by said broaching serrations, said broaching serrations and said complementary serrations being intermeshed, the improvement wherein said outer component has an inturned terminal end, and said inner component has a transverse shoulder, said inturned terminal end bearing axially against said transverse shoulder and positively determines the axial position of said outer component on said inner component.

2. The assembly defined in claim 1, further comprising axial retaining means provided on said inner component bearing axially against said inturned terminal end on the side opposite from said transverse shoulder.

3. The assembly defined in claim 2, wherein said axial retaining means comprises a swaged bead formed on said inner component.

4. The assembly defined in claim 1, wherein the length (e) of said broaching serrations is substantially axially shorter than the effective length (E) of said sleeve overlying said inner component.

5. The assembly defined in claim 1, said component further commprising a web integral with and extending outwardly from said sleeve, wherein said broaching serrations are axially offset relative to the position from which said web extends from said sleeve.

6. The assembly defined in claim 1, further comprising a smooth bearing surface on said outer component on the side of its serrations opposite from said inturned terminal end and a bearing surface on said inner component on the side of its serrations opposite from said transverse shoulder, the first-mentioned bearing surface being received on the second-mentioned bearing surface, one of said bearing surfaces being smooth.

7. The assembly defined in claim 1, said inturned terminal end being substantially radially inturned.

8. The assembly defined in claim 1, wherein said serrations are formed on said inner component.

9. The assembly defined in claim 6, wherein the length (e) of the said serrations is axially shorter than the distance (E) from said smooth bearing surfaces to said transverse shoulder on said inner component.

10. The assembly defined in claim 1, wherein said sleeve and said inner component are in contact along a smooth cylindrical bearing surface to the side of said serrations axially remote from said transverse shoulder and between the side of said serrations axially adjacent said transverse shoulder and said transverse shoulders.

11. The assembly defined in claim 1, wherein said sleeve and said inner component are in contact along a smooth cylindrical bearing surface to the side of said serrations axially remote from said transverse shoulder defining means for permitting slight torsional movement of said outer component axially remote from said inturned terminal end.

12. An assembly of two coaxial components comprising an inner component defining a cylindrical hub and an outer component including a sleeve fixed for rotation with said hub and a transverse web extending from one end of said sleeve, one of the components having longitudinal broaching serrations, substantially complementary serrations on the other of said components, said broaching serrations and said complementary serrations intermeshing with each other for transmitting torque between said transverse web and said hub, said outer component comprising an inturned terminal end axially remote from said transverse web, and said inner component comprising a transverse shoulder, said inturned terminal end bearing axially against said transverse shoulder thus positively determining the axial position of said inner component relative to said outer component.

13. The assembly defined in claim 12, further comprising axial retaining means provided on said inner component bearing axially against said inturned terminal end on the side opposite from said transverse shoulder.

14. The assembly defined in claim 13, wherein said axial retaining means comprises a bead on said inner component.

15. The assembly defined in claim 12, wherein the length (e) of said broaching serrations is substantially axially shorter than the effective length (E) of said sleeve overlying said inner component.

16. The assembly defined in claim 12, further comprising a bearing surface on said outer component immediately adjacent said transverse webs and a bearing surface on said inner component on the side of its serrations opposite from said transverse shoulder, the first mentioned bearing surface being received on the second-mentioned bearing surface, one of said bearing surfaces being smooth.

17. The assembly defined in claim 12, said inturned terminal end being substantially radially inturned.

18. The assembly defined in claim 12, wherein said longitudinal serrations are formed on said inner component.

19. The assembly defined in claim 12, wherein the length (e) of the said broaching serrations is axially shorter than the distance (E) from said smooth bearing surfaces to said transverse shoulder on said inner component.

20. The assembly defined in claim 1, wherein said sleeve and said inner component are in contact along a first smooth cylindrical bearing surface substantially in radial alignment with said transverse web and along a second smooth bearing surface between the side of said serrations axially adjacent said transverse shoulder and said transverse shoulder, the first smooth bearing surface having a greater diameter than said second smooth bearing surface.

21. The assembly defined in claim 12, wherein said sleeve and said inner component are in contact along a smooth cylindrical bearing surface substantially in radial alignment with said transverse web defining means permitting slight torsional movement of said transverse web relative to said hub.

* * * * *